Oct. 7, 1958 G. LACHMANN 2,854,906
FILM CONTROL GEAR FOR PHOTOGRAPHIC CAMERAS
Filed Oct. 31, 1955
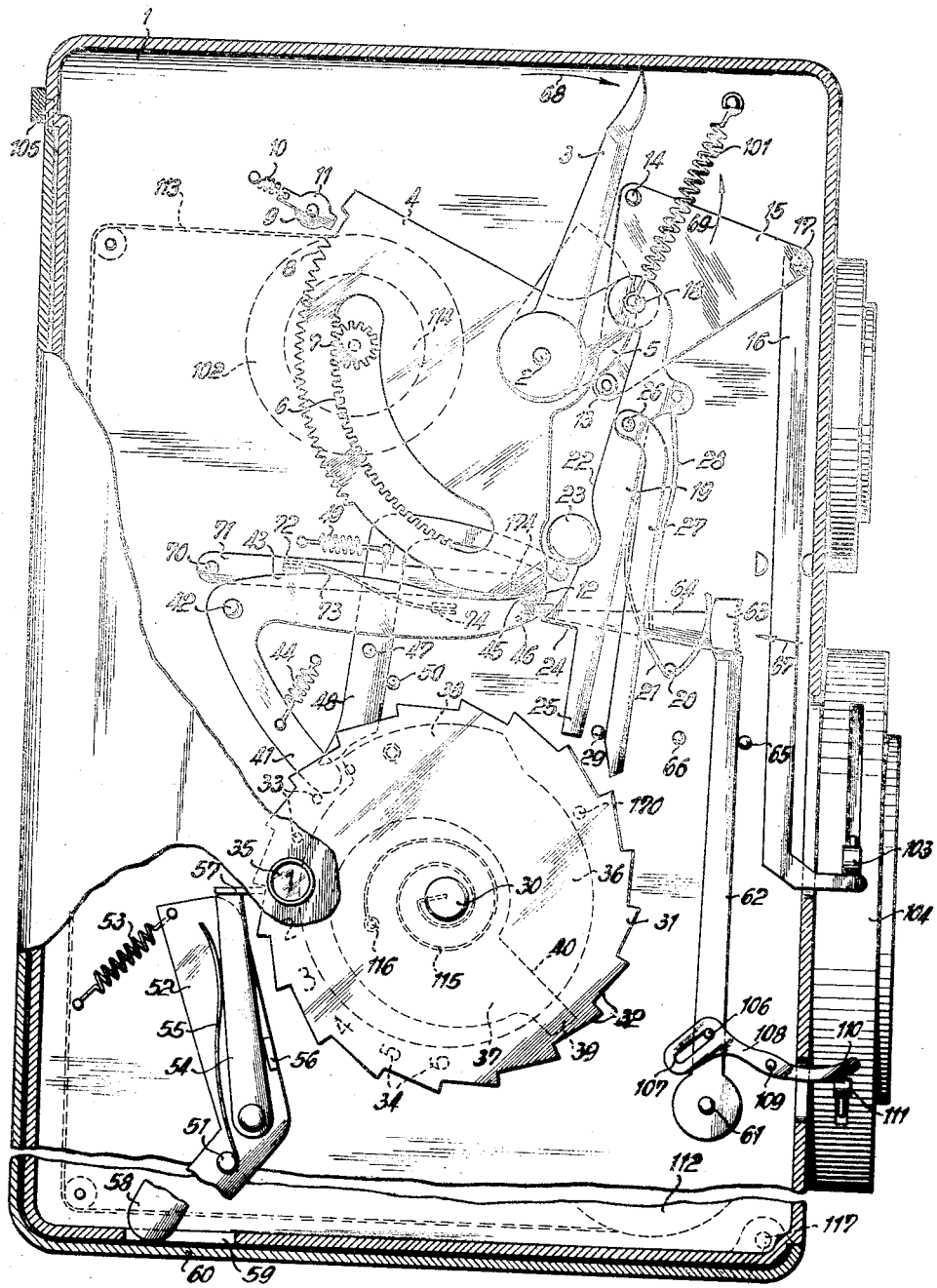
INVENTOR
GÜNTER LACHMANN
BY Mock+Blum
ATTORNEYS

United States Patent Office 2,854,906
Patented Oct. 7, 1958

2,854,906
FILM CONTROL GEAR FOR PHOTOGRAPHIC CAMERAS

Günter Lachmann, Munich, Germany, assignor to Voigtländer Aktiengesellschaft, Braunschweig, Germany, a corporation of Germany Application October 31, 1955, Serial No. 543,914

Claims priority, application Germany November 5, 1954

6 Claims. (Cl. 95—31)

This invention relates to photographic cameras and it has particular relation to a film control gear for photographic cameras.

It is the object of the present invention to provide for photographic cameras a film control gear operated by means of a control member capable of swinging to and fro, said gear serving for the transport of the film and simultaneous setting of the shutter, additionally operating a film counting mechanism and being provided with means for preventing double exposure and transport of film portions which have not been exposed yet.

In a known control gear of this type the control member is connected with a cog wheel or an indented segment which is engaged by a pinion connected with the film take-up spool. It has been also known to render the path of travel of the control member variable in dependence on the diameter of the film taken up by the spool. In order to attain this, a contact element, which is in connection with the control member, is caused to co-operate with a cam disc moved in dependence on the film transport and thereby limits the path of travel. The advance of the film counting mechanism in known devices having the above outlined characteristics, is brought about by members which are arranged on said contact element or toothed segment and operate the film-counting disc upon forward or backward movement of the control member.

By the present invention control gears of the above outlined type are improved by a device for preventing double exposures and the transport of film sections which have not been exposed. According to the invention a stop lever, which engages the indented segment, is provided and this stop lever locks, after each film advancing step, repeated movement of said segment, until a release of the shutter takes place. Furthermore, the control gear embodying the present invention comprises additional devices which automatically keep the stop lever out of engagement with the geared segment during the period of winding the paper tab of a roll film, so that the paper tab can be wound up by repeated unobstructed operation of the control member. Furthermore, devices are provided for automatic locking operation of the control member even after release of the shutter, when the last film section to be exposed is located in the film window of the camera, so that the paper end strip of the film can be wound up only by particular steps. The control means for carrying out these functions consist of cam discs which are fixedly connected with the counting disc of the film-counting mechanism. Upon opening the swingable camera back wall, the counting disc and the cam plates or discs connected therewith automatically return to their initial position.

During transport of the film, the shutter of the camera is simultaneously set. Thus, after release of the shutter no exposure can take place before the control member is operated whereby transport of the film and setting of the shutter are brought about. Therefore, the film control gear permits no double exposure and no idling operation, i. e. no transport of an unexposed film section. The shutter release key is preferably arranged on the camera body. It is connected by suitable transmission elements with the release lever of the camera shutter.

After a release of the shutter, repeated operation of the shutter release key of the camera is possible. But thereby the shutter is not released, because it was not set at that time. There is, therefore, no danger of a double exposure in this case.

Of course, this safety is assured only in the case of a shutter which is firmly built in in the camera. If the above described film control gear is applied to a camera, in which the taking objective is exchangeable together with the shutter, then the shutter newly inserted in the camera together with an exchangeable objective will not be necessarily in the same condition as the shutter removed from the camera previously. Thus, if, for example, a release of the shutter has taken place and directly after this—i. e. prior to a transport of the exposed film—the objective and its shutter are exchanged, which may be the case if the operator has to work fast, it may happen that the shutter of the newly inserted objective is already set, which can be overlooked in a rush. If the film is then not advanced by means of the control member and the shutter release key is first operated, the shutter will be opened and a second exposure of the already exposed film which is still in the film window of the camera, takes place.

In order to prevent such operation of the shutter release key, which results in double exposure, the present invention contemplates the use of a locking member for automatically locking the shutter release key and preventing its repeated operation after each release of the shutter, until the film has been advanced.

Pressure exerted on the shutter release key when the shutter is not set, is taken up by said locking member and can do no harm to the operative elements of the shutter.

It has been found preferable to swingably arrange this locking lever on the camera wall and to bring it in positive connection with the stop lever which locks and releases transport of the film. In this manner the locking lever participates in the movements of the stop lever and, by suitable arrangement, automatically enters with its front edge the range of motion of a bolt member connected with the shutter release key. Thereby, repeated operation of the shutter release key is locked until the stop lever is also removed by tilting of the stop lever during forward movement of the film, from the range of motion of the bolt member of the shutter release key.

The stop lever thus prevents operation of the shutter release key even if the taking objective and its built in shutter are separated from the camera body.

The stop lever prevents double exposure also in cases, in which, for example after an exposure of the film, the exchangeable objective and its shutter are substituted by another objective with a shutter which is already set, i. e. ready for an exposure. Locking of the shutter release key is not released until after the film is moved forward whereby the shutter setting operative elements of the control gear idle, whereupon the subsequent exposure of a new film section can take place.

If, however, after forward movement of the film, an objective with its shutter set, is substituted by an objective with unloaded shutter, the latter can be set by immediate possible operation of the shutter-setting lever.

The appended drawing illustrates by way of example in top view an embodiment of and a best way of carrying out the invention, to which the invention is not limited.

As shown in the drawing on a sidewall of the camera 1 a control lever 3, a control segment 4 firmly connected with said lever and a cocking cam 5 are arranged and are capable of swinging about a common axis 2. These parts are under the effect of a spring 101, which tends to keep them in the position shown in the drawing. Control segment 4 is provided with a gear rim 6, which meshes with the toothing of a film key pinion 7, which is in connection with the take-up film spool 102 of the camera, over a one-way coupling. A reversing locking lever 11, which is pivoted at 9 and is under the effect of spring 10, co-operates with locking gear rim 8 of segment 4 and said lever 11 permits a movement of segment 4 oppositely to the direction of the occurring movement only after the end positions are reached. Segment 4 is provided also with a recess 12. A sliding roller 13, which is fastened to a segment 15 pivoted at 14, lies against cocking cam 5. One end of a bar 16 is connected at 17 with segment 15, while its other end is in connection with setting lever 103 of the camera shutter 104. At one eye of the segment 4 a contact lever 19 is tiltably pivoted at 18. By a hairpin spring 21 fastened at 20, contact lever 19 is held by its guide edge 22 against a butting ring 23 which is stationary in the casing. Lever 19 is provided with a locking nose 24 and a contact member 25. A counting transport lever 27 is pivoted at 26 on lever 19. Lever 27 is pressed by a hairpin spring 28, which is fastened to lever 19, against stop pin 29, which is stationary in the casing.

A counting wheel 31 provided with teeth 32 is arranged on shaft 30. A spring 115, which is fastened on the one hand to shaft 30 and on the other hand, to a bolt 116, which is stationary in the casing, tends to turn back counting wheel 31 oppositely to its movement imparted to it in counting a film. Adjusting marks 33 and figures 34 provided thereon, can be recognized through a window 35 provided in the outer wall of the camera. An idler control cam 36 and a contact cam 37 are firmly connected to counting wheel 31. The greatest part of the periphery of cam 36 extends in the form of a circle around the center of shaft 30. The rest of the periphery denoted 38 in the drawing has a greater diameter than the beforementioned part and extends likewise in the form of a circle around shaft 30. The contact cam 37 has the form of a spiral and ends in contact nose 39 provided with a stop edge 40. A stop lever 43 tiltably pivoted at 42, lies with its arm 41 against the peripheral edge of control cam 36, under the effect of a spring 44. The other arm of this lever 43 has a nose 45. Furthermore, a pin 46 is provided on said arm. The arm of a stop lever 48 tiltably pivoted at 47 projects into the range of said nose 39 of contact cam 37, lever 48 being held by a spring 49 against a stop 50 which is stationary in the casing.

A counting-stop carrier 52, which is tiltably arranged on pin 51 is engaged by a spring 53. A counting-stop or detent 54 which is arranged on member 52, is pressed by a hairpin spring 55 against stop 56 of member 52 and at the same time projects with its detent 57 into the range of teeth 32 of counting disc 31. The free end 58 of member 52 extends through a recess 59 of the camera body and lies against the inner surface of the camera back wall 60. The latter is tiltable about hinge 117 arranged in the camera body 1. Backwall 60 is held in locked position by a locking device 105 arranged on the camera body 1.

A release lever 62 is tiltable about pivot 61. A pin 106 fastened to lever 62 engages a slot 107 provided in a swinging lever 108. The latter can be turned about pivot pin 109. The free arm 110 of this lever is in connection with shutter release lever 111 of the camera shutter 104. A release key 63 and an unlocking member 64 are connected with lever 62. One end of hairpin spring 21 lies against release key 63, whereby release lever 62 is pressed against stop 65. A stop 66 limits swinging against the spring effect of lever 62.

A locking lever 71 is tiltably arranged on a pin 70, which is stationary in the casing. Lever 71 is provided with a projection 72, which lies against stop lever 43. A spring 73, which is fastened, on the one hand, to projection 72 and on the other hand to a projection 74 of stop lever 43, keeps lever 71 in said position. Thus, the locking lever is tilted simultaneously with stop lever 43.

The device according to the invention operates as follows.

The parts of the device are shown in the drawing in a position, in which the first section of the inserted film is ready for exposure. This is shown by the figure "1" which can be seen in window 35. Movement of control lever 3 and thus advance of the film prior to an exposure is prevented, as stop lever 43 engages by its nose 45 recess 12 of segment 4 and locks movement thereof.

Upon exerting pressure on release key 63 in the direction of arrow 67, release lever 62 will be tilted against the effect of hairpin spring 21. Thereby pin 106 is guided in slot 107 of swinging lever 108. The latter swings about its pivot 109 and operates by its free arm 110 shutter release lever 111 of the camera shutter 104.

Unlocking member 64, which has been simultaneously displaced, thereby enters the space between pin 46 of stop lever 43 and locking lever 71 and comes in contact with these two parts. By its lower edge (with reference to the drawing) unlocking member 64 acts during its further movement on pin 46 in such a manner that it causes swinging of stop lever 43, whereby nose 45 is removed from recess 12 of control segment 4. In the course of this swinging step, the free end of stop lever 43, which carries nose 45, comes to be located under locking nose 24 of contact lever 19. Locking lever 71 lies during this control step against the upper edge (with reference to the drawing) of unlocking member 64. Its projection 72 thereby separates from stop lever 43, against the effect of spring 73. At the backward motion of release lever 62 to its initial position, stop lever 43 is held back with its free end under locking nose 24 of contact lever 19, so that its nose 45 is not in engagement anymore with segment 4. Locking lever 71 glides off from the upper edge of unlocking member 64 and is drawn by spring 73 with its projection 72 to lie again against stop lever 43. Thereby, front edge 174 of locking lever 71 becomes located in front of the point of unlocking member 64, so that repeated operation of release key 63 is prevented.

By operating control lever 3 in the direction of arrow 68, transport of the film can take place without hindrance. Gear rim 6 of segment 4, which is thereby moving, drives film key pinion 7. By this, film spool 102 is rotated so that roll film 113, which is unwound from its spool 112, is advanced. Thereby the simultaneously moving cocking cam 5 imparts over sliding roller 13 a rotating movement in the direction of arrow 69 to cocking segment 15. Rod 16 is moved simultaneously and thereby operates setting or cocking lever 103 of camera shutter 104.

At the same time contact lever 19 is moved. It is guided under the effect of hairpin spring 21 with its guide edge 22 along ring 23 and abuts during its movement with its contact element 25 against contact cam 37, whereby movement of the control lever 3 is limited. Thus, the size of the stroke of control lever 3 is determined by the position of contact cam 37 at the respective moment and said position is dependent on the diameter of the wound up film on film take-up spool 102. As the diameter of the wound up film roll increases, cam 37 will occupy such positions which admit decreasing strokes of lever 3, so that always a film section of equal length is transported.

Together with the moving contact lever 19, counting transport lever 27 too is guided under the effect of hairpin spring 28 along stop pin 29. Its free end comes thereby in engagement with one of the teeth 32 of counting wheel 31 and causes the same to turn by the length of a tooth. The next tooth 32 lifts after a counting step the free end of lever 27 from the engagement with the tooth so that its further movement has no effect on the counting wheel. In this rotation of wheel 31, which takes place as a consecutive counting, a spring 115 which is connected to shaft 30 of counting wheel 31 and to stationary bolt 116, is tensioned. Backward movement of the counting wheel 31 is prevented due to the engagement of teeth 32 by counting detent 57.

In the movement of contact lever 19 its locking nose 24 slides off from the free end, which carries the locking nose 45, of stop lever 43 so that when after a complete control stroke the control lever 3 together with segment 4 returns under spring effect to the initial position shown in the drawing, stop lever 43 with nose 45 will enter again recess 12 of segment 4 and locks repeated movement thereof. At the same time locking lever 71 too is tilted to the position shown in the drawing, so that in a subsequently possible operation of release key 63, the unlocking member 64 can enter the space between pin 46 of stop lever 43 and the locking lever in the manner already described above.

When the last film section is transported to the window of the camera, contact cam 37 will reach such a position that its nose 39 comes in contact with the free end of locking lever 48, which extends into its range, and causes tilting of the lever 48 against the effect of spring 49. Its other free end comes in contact with contact lever 19 and causes its tilting about pivot 18 to such an extent, that during the subsequent shutter release the tilting stop lever 43 does not come into the range of locking nose 24 of lever 19, but rather enters again with its locking nose 45 the recess 12 of segment 4 and locks further operation of control lever 3. The paper end tab of the film 113 can be wound then by means of a hand button 114 to the film take-up spool 102. Film key pinion 7 which is connected by a coupling with film take-up spool 102 is thereby not moved.

If in order to remove the exposed film, the back wall 60 of the camera is opened, the free end 58 of member 52, which carries the counting detent, enters the space set free under the effect of spring 53 through recess 59. Thereby, stop 56 takes along counting detent 54 so that detent element 57 comes out of engagement with teeth 32 of counting wheel 31. The latter is turned back by spring 115 until the stop edge 40 of contact cam 37 abuts against stationary stop 170, whereby the backward movement is limited. The first of the adjusting marks 33 is now visible in window 35. At the same time, idler control cam 36 enters with its part 38 the range of arm 41 of stop lever 43 and causes removal of locking nose 45 of said lever from engagement with recess 12 of segment 4.

A film to be newly inserted in the camera is fastened by its starting paper tab to film take-up spool 102 and is brought to the desired position by means of the beforementioned hand button 114. The camera wall is then closed, whereby detent 57 comes again in engagement with teeth 32 of counting disc 31. Control level 3 is now repeatedly operated, whereby said starting paper tab is advanced. When the first film section is located at the film window, the counting wheel exhibits figure "1" in window 35. At the same time, arm 41 of stop lever 43 glides off from part 38 of cam 36 and by falling in of nose 45 in recess 12 of control segment 4, locks repeated movement thereof until the first release of the shutter has taken place.

It will be understood from the above that this invention is not limited to the specific elements, steps, designs and other details specifically described above and illustrated in the drawings and can be carried out with various modifications without departing from the scope of the invention as defined in the appended claims.

What is claimed is:

1. A photographic camera comprising a control gear, adapted to be operated by a control handle capable of being tilted to and fro, for transport of the film, setting of the shutter and advancing an image counting wheel, these control movements being brought about by a single tilting of a control lever, which is fixedly seated on a shaft, between its rest position and an end position; a spring for returning said control lever from said end position to said rest position; a control segment provided with a gear rim being fixedly seated on the shaft of said control lever, said gear rim being adapted to be engaged by a pinion connected with the film take up spool over a one way coupling; said control segment being provided with a recess in such position that during return of the control segment to the rest position a stop lever is adapted to enter said recess, whereby the control segment is locked in this position; an unlocking member being fastened to the shutter release lever, said unlocking member causing—upon operation of said release lever—removal of the stop lever from its engagement with the control segment; arranged on a flap of the control segment, a contact lever and a counting transport lever; said counting transport lever coming in engagement—upon each control movement of the control segment—with teeth of a counting wheel and thereby causing movement of the latter by a counting step; said contact lever striking, during the control movement of the control segment, against a contact cam connected with the counting wheel, whereby the control movement of the control segment is limited; seated on the shaft of the control lever a cocking cam for controlling a gear operating the setting lever of the camera shutter, upon control movement of the control segment.

2. A photographic camera as claimed in claim 1, comprising, tiltably arranged on the camera wall, a locking lever which is in positive engagement with the stop lever which locks and releases transport of the film, in such a manner that, after each release of the shutter, it automatically enters with its front edge the motion range of a locking element connected with the shutter release key, whereby operation of the shutter release key is locked until by tilting of the stop lever, which takes place during advance of the film, the locking lever is also removed from the motion range of the locking element of the shutter release key.

3. A photographic camera as claimed in claim 2, comprising a contact lever arranged on the control segment; a locking nose provided on said contact lever, for keeping the stop lever, which has been brought out of engagement with the control segment by the shutter release operation, in this condition.

4. A photographic camera as claimed in claim 1, comprising an idler control cam arranged on the common shaft for the counting wheel and the contact cam and fixedly connected with said wheel and cam; the idler control cam extending on the major part of its periphery in circular shape about its shaft; the residual part of said periphery extending likewise in circular shape about its shaft, but at a greater distance from the shaft; said residual peripheral part of the idler control cam being adapted to come in contact with the arm projecting into its range, of the locking lever, whereby the latter with its locking nose is kept out of engagement with the control segment; the counting wheel, the contact cam and the idler control cam, forming a structural group and a spring urging the members of this group to an initial position, in which a stop edge of the contact cam lies against a stationary stop in the camera casing.

5. A photographic camera as claimed in claim 4, in which the control cam is provided with a contact nose which, at a suitable position, adjusts an arm of a tiltably arranged locking lever in such a manner that another arm of said locking lever causes tilting of the contact lever and thereby keeps the locking nose of the contact lever out of the tilting range of the locking lever.

6. A photographic camera as claimed in claim 5, comprising a counting-detent adapted to engage the teeth of the counting wheel; said counting-detent being adapted to prevent the counting wheel advanced against spring effect, from turning backward, and being tiltably arranged on one arm of a lever-like counting-detent carrier, the other arm of which is moved by the swingable camera back wall in such a manner that, in closed position of said camera back wall, the counting detent engages the teeth of the counting wheel, while, in open position of the camera back wall the counting-detent is kept out of engagement with the teeth of the counting wheel.

References Cited in the file of this patent

UNITED STATES PATENTS

| | | |
|---|---|---|
| 2,104,094 | Nerwin | Jan. 4, 1938 |
| 2,148,636 | Muller et al. | Feb. 28, 1939 |
| 2,301,956 | Kuppenbender et al. | Nov. 17, 1942 |
| 2,365,690 | Fassin | Dec. 26, 1944 |

FOREIGN PATENTS

| | | |
|---|---|---|
| 14,927 | Great Britain | 1893 |
| 472,034 | Italy | June 4, 1952 |
| 709,981 | Great Britain | June 4, 1954 |